US008875120B2

(12) United States Patent  
Venkatesan et al.

(10) Patent No.: US 8,875,120 B2  
(45) Date of Patent: Oct. 28, 2014

(54) METHODS AND APPARATUS FOR PROVIDING SOFTWARE BUG-FIX NOTIFICATIONS FOR NETWORKED COMPUTING SYSTEMS

(75) Inventors: Bhadri Narayanan Venkatesan, Foster City, CA (US); Ryan Brainard, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 127 days.

(21) Appl. No.: 13/563,471

(22) Filed: Jul. 31, 2012

(65) Prior Publication Data

US 2013/0036413 A1 Feb. 7, 2013

Related U.S. Application Data

(60) Provisional application No. 61/513,768, filed on Aug. 1, 2011.

(51) Int. Cl.  
*G06F 9/44* (2006.01)

(52) U.S. Cl.  
USPC ............................. 717/172; 717/173; 717/174

(58) Field of Classification Search  
USPC .......................... 717/172–176; 709/203–204  
IPC ................... G06F 8/65,8/71, 8/72, 8/77, 11/36, G06F 11/51, 11/04, 11/3003, 11/3696, 11/3636  
See application file for complete search history.

(56) References Cited

U.S. PATENT DOCUMENTS

| 5,577,188 | A | 11/1996 | Zhu |
|---|---|---|---|
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |

(Continued)

OTHER PUBLICATIONS

Jansen et al, "Evaluating the Release, Delivery, and Deployment Processes of Eight Large Product Software Vendors applying the Customer Configuration Update Model", ACM, 65-68, 2006.*

(Continued)

*Primary Examiner* — Anil Khatri

(74) *Attorney, Agent, or Firm* — Ingrassia Fisher & Lorenz, P.C.

(57) ABSTRACT

A customer initiates a customer support request indicating that a bug exists in an particular application. An internal bug-fix tracking system includes a case status server that receives a notification event indicating that the bug has been fixed in an updated software release. The associated customer support request is then updated to reflect the bug fix, triggering a notification e-mail that is automatically and directly sent to the customer.

11 Claims, 4 Drawing Sheets

(56) References Cited

U.S. PATENT DOCUMENTS

| | | | |
|---|---|---|---|
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,496,850 B1 * | 12/2002 | Bowman-Amuah | 709/203 |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,606,744 B1 * | 8/2003 | Mikurak | 717/174 |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,816,882 B1 * | 11/2004 | Conner et al. | 709/203 |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,990,660 B2 * | 1/2006 | Moshir et al. | 717/171 |
| 7,000,230 B1 * | 2/2006 | Murray et al. | 717/172 |
| 7,047,279 B1 * | 5/2006 | Beams et al. | 709/204 |
| 7,055,149 B2 * | 5/2006 | Birkholz et al. | 717/172 |
| 7,178,144 B2 * | 2/2007 | Melchione et al. | 717/172 |
| 7,340,411 B2 | 3/2008 | Cook | |
| 7,620,655 B2 | 11/2009 | Larsson et al. | |
| 7,698,160 B2 | 4/2010 | Beaven et al. | |
| 7,735,078 B1 * | 6/2010 | Vaidya | 717/171 |
| 7,802,246 B1 * | 9/2010 | Kennedy et al. | 717/173 |
| 7,823,147 B2 * | 10/2010 | Moshir et al. | 717/173 |
| 7,827,549 B2 * | 11/2010 | Tarassov | 717/174 |
| 7,979,856 B2 * | 7/2011 | Murray et al. | 717/173 |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 8,418,172 B2 * | 4/2013 | Addington et al. | 717/177 |
| 8,464,246 B2 * | 6/2013 | Davies et al. | 717/174 |
| 8,464,249 B1 * | 6/2013 | Goldman et al. | 717/176 |
| 8,527,979 B2 * | 9/2013 | Wookey | 717/169 |
| 8,612,773 B2 * | 12/2013 | Nataraj et al. | 713/192 |
| 8,621,453 B2 * | 12/2013 | Wookey | 717/175 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |

OTHER PUBLICATIONS

Marquardt, "Patterns for Software Release Versioning", ACM, pp. 1-13, 2010.*

Hosek et al, "Safe Software Updates via Multi-version Execution", IEEE, pp. 612-621, 2013.*

Storm, "Continuous Release and Upgrade of Component-Based Software", ACM, pp. 43-57, 2007.*

* cited by examiner

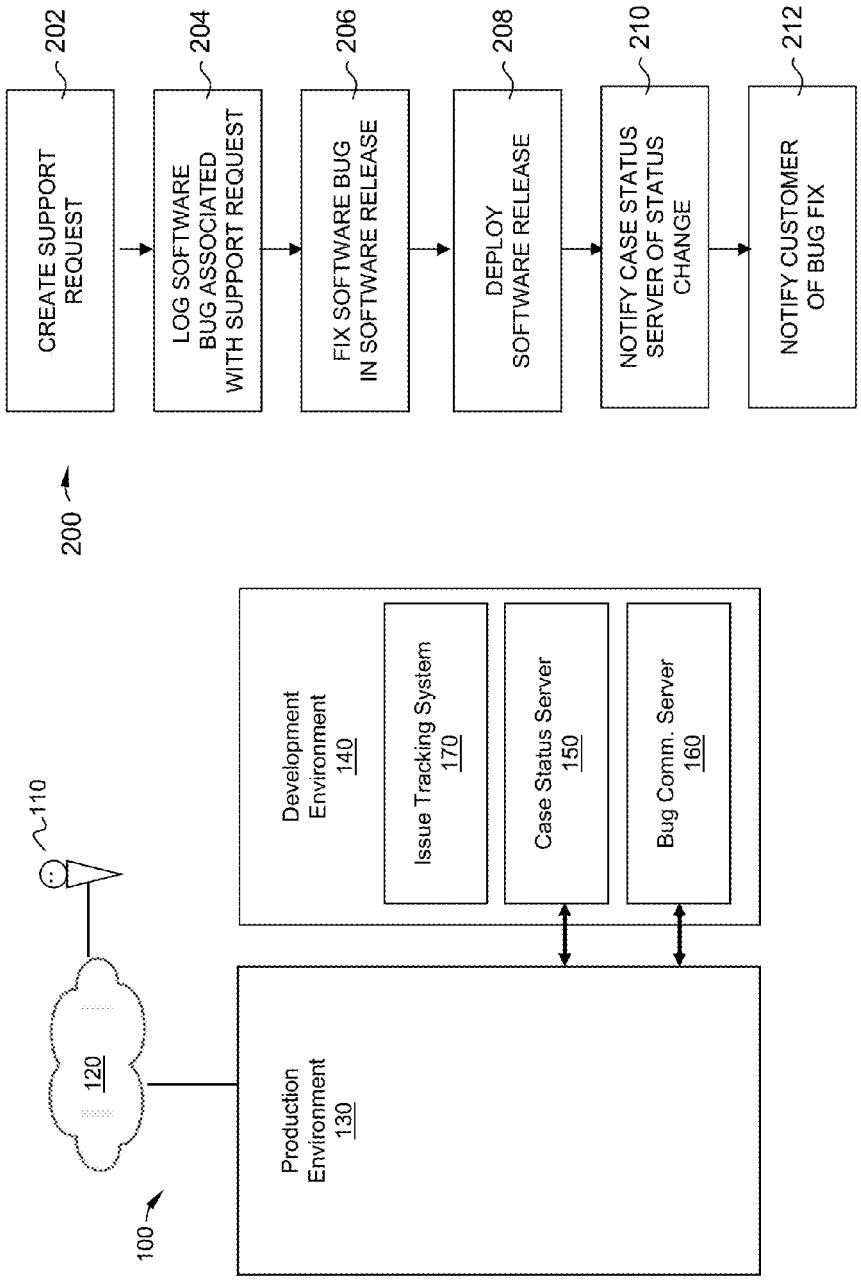

METHODS AND APPARATUS FOR PROVIDING SOFTWARE BUG-FIX NOTIFICATIONS FOR NETWORKED COMPUTING SYSTEMS

CROSS-REFERENCE TO RELATED APPLICATION(S)

This application claims the benefit of U.S. Provisional Patent application Ser. No. 61/513,768 filed Aug. 1, 2011, the entire contents of which are incorporated by reference herein.

TECHNICAL FIELD

Embodiments of the subject matter described herein relate generally to software flaws (or "bugs") occurring in the context of computer systems. More particularly, embodiments of the subject matter described herein relate to methods of notifying customers that a bug has been fixed in the context of networked computing systems.

BACKGROUND

In the context of networked computing systems, a user, customer, or other entity may experience a "software" bug associated with an application—i.e., an error, defect, or other flaw that produces a result that is incorrect, unexpected, or otherwise undesirable. A request to fix such a bug may then be initiated by the user in a variety of ways, and this request will generally prompt a software developer to address the bug and deploy an improved software release providing a "fix" for the identified bug.

In most contexts, particularly those involving cloud computing, database applications, and systems supporting virtual applications using a common application platform, the customer reporting the bug in a support request is never directly notified that the bug has been fixed or otherwise addressed. That is, while a particular deployed software version may indeed address a particular bug (as well as other bugs not associated with a customer request) the user will generally never be directly notified of this fact. While in some cases a series of release notes may be manually posted on a website when a new software version is released, such release notes are generally vague and do not allow a user to easily correlate a bug fix with a particular bug fix request. Furthermore, as a passive webpage, such release notes do not constitute a direct notification from the organization to the user, and are not provided automatically.

Accordingly, there is a need for improved systems and methods for notifying users that particular software bugs have been addressed.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 1 is a conceptual block diagram in accordance with one embodiment;

FIG. 2 is a flowchart depicting a method in accordance with one embodiment;

DETAILED DESCRIPTION

Figure 3:
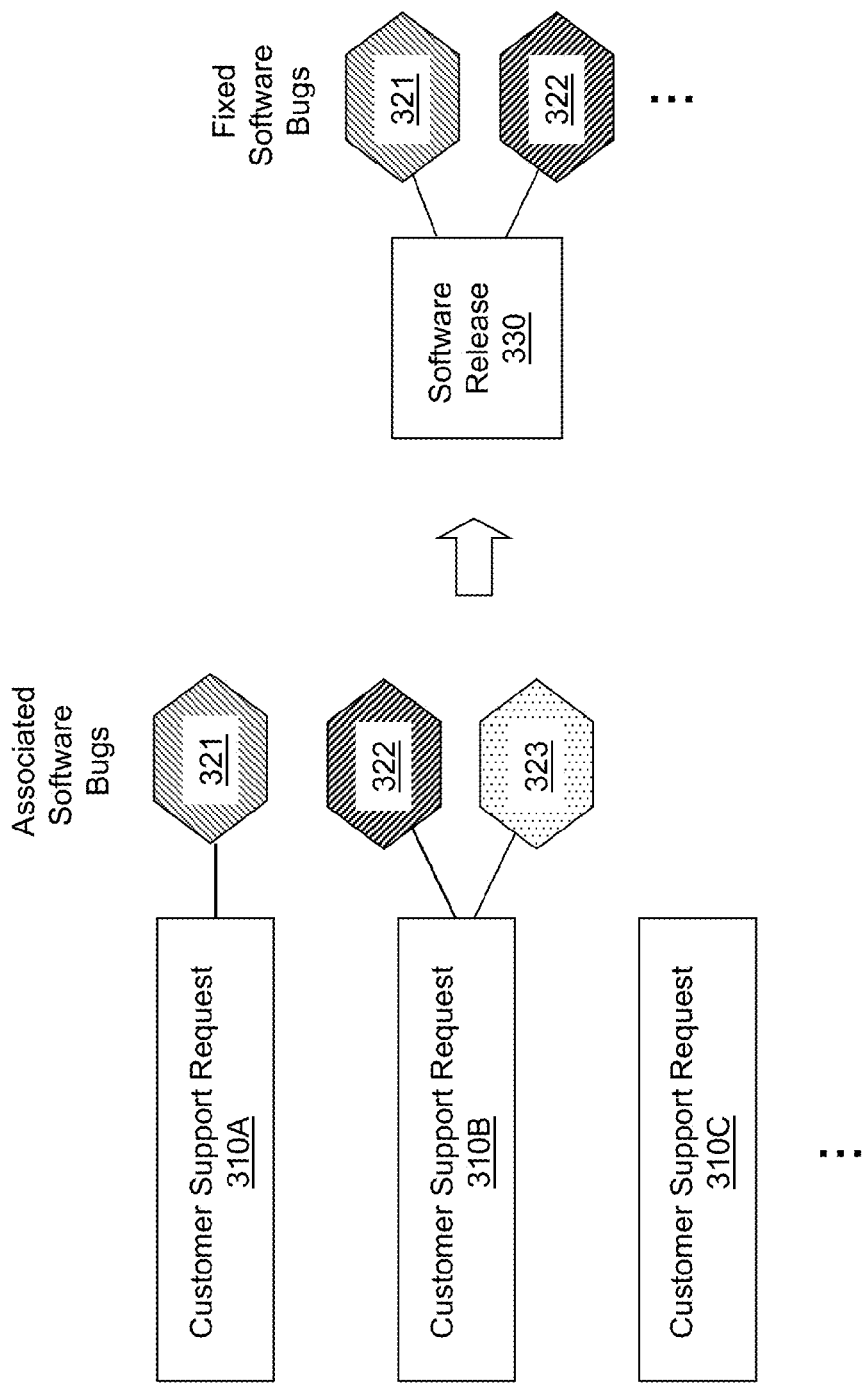
FIG. 3 is a conceptual diagram depicting customer support requests and associated software bugs in accordance with one embodiment.

Embodiments of the subject matter described herein generally relate to systems and methods for directly and automatically notifying a customer that one or more bugs identified in a customer support request have been addressed by an updated software release. In one embodiment, a case status server receives a notification event indicating that a bug in an application has been fixed. The associated customer support request is updated to reflect the bug fix, triggering a notification e-mail that is automatically and directly sent to the customer, customer representative, and/or another case owner.

FIG. 1 is a conceptual block diagram depicting an overview of a bug tracking system 100 (or simply "system") communicatively coupled to a user, organization, company, customer representative, or other such case owner (referred to without loss of generality as a "customer") 110 via a network 120 (e.g., the Internet). System 100 generally includes a production environment 130 and a development environment 140, wherein the development environment 140 includes, for example, a case status server (or servers) 150, a bug communication server (or servers) 160, and an issue tracking system 170 interconnected via a network in any convenient manner.

Production environment 130 generally includes those systems that are accessible to customer 110 through network 120, and in that respect may include any combination of software and hardware configured to provide the functionality described herein. In various embodiments, production environment 130 includes any number of servers, databases, and the like. It is through this environment that customer 110 normally accesses and runs applications. Production environment 130 may or may not require authentication by customer 110, depending upon the nature of the services being provided to customer 110. Although not illustrated, any number of customers 110 may interact with their own respective production environments (e.g., virtual servers) within a single production environment 130. Production environment will typically provide a range of well known services to customer 110, including various cloud-based services such as data storage, software-as-a-service (SaaS), and the like. In a particular embodiment, production environment 130 dynamically creates and supports virtual applications using a common application platform, such a multi-tenant database system (described in further detail below).

Services and applications, such as mobile applications used in connection with mobile devices, may also be provided within production environment 130. Furthermore, the phrase "production environment" is used herein without loss of generality to include any environment to which an updated software release may be deployed. Thus, the present subject matter comprehends, for example, that a bug fix may be directly deployed to a mobile device (without necessarily residing within development environment or a server within production environment 130), and that the bug-fix notification methods described herein also apply to such a case.

The term "application" is used in its conventional sense as software code, in any form now known or later developed (e.g., source code, object code, bytecode, and/or executable binaries), that allows a customer 110 to perform a particular task. Example applications include database software, word-processing software, spreadsheet software, system software, middle-ware, and the like. Furthermore, the term "application" may be used, without loss of generality, to refer to a software component that makes up only a small portion of a larger application, i.e., a particular class definition, DLL file, or other such component.

Development environment 140 generally includes those systems that are not directly accessible to customer 110 through network 120 (e.g., are behind a firewall), and in that respect may include any combination of software and hardware configured to provide the functionality described herein. Development environment might typically include systems configured for tracking, development, testing, and/or releasing software (i.e., to production environment 130). In the illustrated embodiment, development environment 140 includes an issue tracking system 170, a case status server (or servers) 150, and a bug communication server (or servers) 160, all of which are communicatively coupled and configured to provide bug tracking and notification as described in further detail below. It will be appreciated that development environment 140 may also include other components or systems, such as individual developers' computer systems (not illustrated). Development environment 140 is generally configured to provide "event notification" relating to events (such as bug fixes and application status changes) occurring within development environment 140, as described in further detail below.

Case status server 150 is communicatively coupled to both production environment 130 (e.g., through a data communication network) and is generally configured to sense event notifications that occur within development environment 140 using any convenient event model known in the art. Case status server 150 may automatically sense changes to applications, customer support requests (or "cases"), bug-fixes, and/or perform a variety of other functions. Stated another way, case status server 150 "listens" for updates occurring within development environment 140. In one embodiment, for example, case status server 150 automatically detects an event notification relating to the status of an application or other software component changing from "in progress" to "deployed." Case status server 150 may also query development environment 140 for additional information regarding a bug, such as a patch number associated with the bug-fix, the bug number, the actual major release number, the date when the bug-fix was released to the production environment.

Bug communication server 160 is configured to transfer information relating to customer support requests from production environment 130 to development environment 140. Case status server 150 is then later notified (through a bug-fix event determined within development environment 140) that one or more bugs have been fixed, and then moves information about bugs back to the appropriate existing customer support request. Thus, in general, bug communication server 160 transfers information from production environment 130 to development environment 140, and case status server 150 transfers information from development environment 150 to production environment 130.

Issue tracking system 170 includes any suitable combination of hardware and software configured to track information (e.g., metadata) relating to bug and software releases associated with development environment 140. In this role, issue tracking system 170 communicates with case status server 150 and/or bug communication server 160, as may be appropriate.

As mentioned briefly above, customer 110 may, in the course of normal interaction with system 100, determine that an application deployed on production environment 130 (and/or a common application platform itself) exhibits a "bug." As mentioned previously, the term "bug" is used herein consistent with its traditional meaning in the software engineering field as an error, defect, or other software flaw that produces a result that is incorrect, unexpected, or otherwise undesirable.

Referring now to FIG. 1 in combination with exemplary method 200 depicted in FIG. 2, when customer 110 determines that a bug exists within an application, the customer may then create a customer support request (step 202) in any suitable manner. In some embodiments, the customer 110 may contact a customer support representative (not illustrated) via e-mail, telephone, etc., whereupon that customer support representative will create the customer support request for customer 110. In other embodiments, customer 110 creates a customer support request by interacting with production environment 130 over network 120. The support request may take a variety of forms, but in general will typically include at least a description of the bug (from the point of view of customer 110) and associated data such as the identity of the application (or applications) of interest, the time and date of the request, the software version number associated with the application, etc., all or part of which may be provided by customer 110 or populated automatically by system 100. In a particular embodiment, for example, the customer support request appears as a web-based form that is filled in by customer 110 using a conventional web browser. The customer support request will then typically be given a unique support request identification number for future reference by customer 110 and system 100.

Next, in step 204, system 100 automatically logs (i.e., identifies and suitably stores) data specifying the software bug (or bugs) associated with the customer support request and notifies development environment 140. This may be performed, for example, by bug communication server 160. Some customer support requests may include one or more associated software bugs, while others do not. This is illustrated conceptually in FIG. 3, which depicts three customer support requests 310A-C. Customer support request 310A includes one associated software bug 321, customer support request 310B includes two associated bugs 322 and 323, and customer support request 310C includes no associated software bugs.

In due course, in step 206, a developer (not illustrated) will then typically debug, modify or otherwise fix or "address" the software that has caused or is otherwise associated with a bug in an application identified within a customer support request. This may take place, for example, on computer systems that are external to system 100 or are within development environment 140. Ultimately, however, this process and will generally lead (in step 208) to an updated software release being deployed to production environment 130. Referring briefly again to FIG. 3, a particular software release 330 may address some bugs (i.e., bugs 321 and 322), and not address others (i.e., bug 323).

Next, in step 210, the case status server 150 is notified (e.g., by development environment 140) of a status change relating to the application identified within the customer support request. As mentioned previously, case status server 150 is configured to "listen" for event notifications from development environment 140 and or from external systems, including any event notifications relating to a bug-fix associated with a particular application.

Finally, in step 212, customer 110 is directly and automatically notified that a particular bug identified by that customer has been fixed in the deployed updated software release. In the event that multiple customers 110 reported the same bug within their respective customer support requests, a notification may be provided to each of the customers.

The bug-fix notification may take a variety of forms. In one embodiment, for example, an e-mail is sent directly to the customer (or representative of the customer) who originally filed the related customer support request. For example, in one embodiment the customer report request includes a "case comments" section in which case status server 150 can note that the bug has been fixed. When the associated case comments are updated to reflect the bug fix, the notification e-mail is automatically and directly sent to the customer. The bug-fix notification email may include, for example, an identification of the bug, the case number, the status of the bug, the release number associated with the bug-fix, and other such information that might be helpful to the customer.

Figure 4:
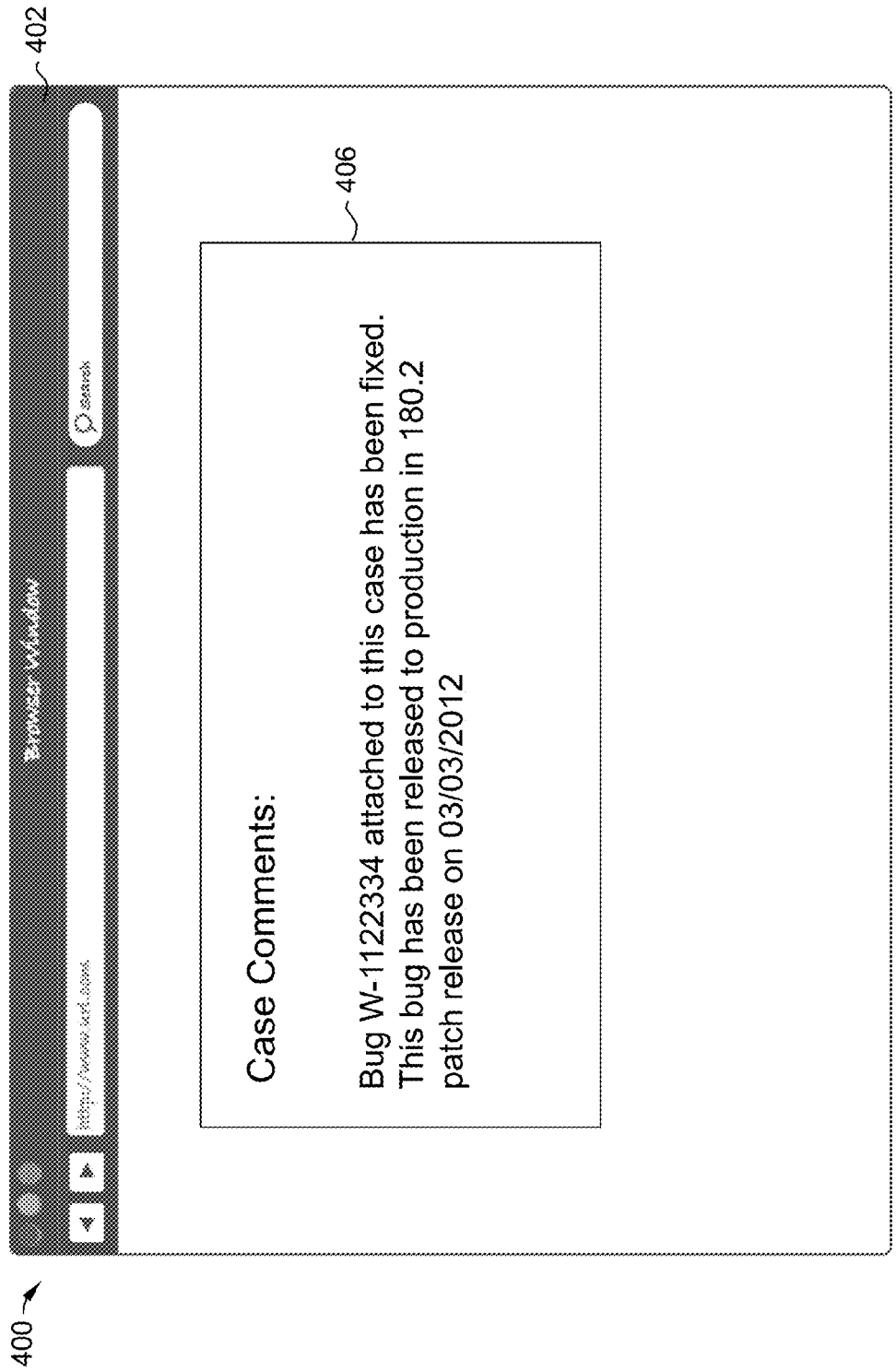
FIG. 4 depicts an exemplary browser-based notification.

FIG. 4 depicts an example notification 400 and including case comments in the form of a webpage 402 displayed by a conventional browser. In this embodiment, a notification message 406 is provided within webpage 402, wherein notification message 406 includes a bug identification "W-1122334" the patch release number ("180.2"), and the release date ("Mar. 3, 2012"). It will be appreciated that FIG. 4 presents a simplified example, and that in practical embodiments additional information will typically be presented in conjunction with the case comments, including, for example, the case owner, the case number, the case status, the severity level, the escalation reason, customer contact information, and the like.

Thus, the systems and methods outlined above provide an internal bug tracking system that provides a notification that is both direct (as opposed to conventional release notes published on a website, such as Github, Google Code, or the like) and automatic (as opposed to manually provided, in summary form, on a website).

In accordance with various embodiment, the bug-fix systems and methods described above are used in the context of a multi-tenant database system. More particularly, referring to FIG. 5, an exemplary multi-tenant system 500 includes a server 502 that dynamically creates and supports virtual applications 528 based upon data 532 from a common database 530 that is shared between multiple tenants, alternatively referred to herein as a multi-tenant database. Data and services generated by the virtual applications 528 are provided via a network 545 to any number of client computing devices 540, as desired. Each virtual application 528 is suitably generated at run-time using a common application platform 510 that securely provides access to the data 532 in the database 530 for each of the various tenants subscribing to the multi-tenant system 500. In accordance with one non-limiting example, the multi-tenant system 500 is implemented in the form of a multi-tenant customer relationship management (CRM) system that can support any number of authenticated users of multiple tenants. The various components of production environment 130 and/or development environment 140 of FIG. 1 may be provided within system 500 or within a separate system communicatively coupled to system 500.

As used herein, a "tenant" or an "organization" should be understood as referring to a group of one or more users that shares access to common subset of the data within the multi-tenant database 530. In this regard, each tenant includes one or more users associated with, assigned to, or otherwise belonging to that respective tenant. Tenants may represent customers, customer departments, business or legal organizations, and/or any other entities that maintain data for particular sets of users within the multi-tenant system 500. Although multiple tenants may share access to the server 502 and the database 530, the particular data and services provided from the server 502 to each tenant can be securely isolated from those provided to other tenants. The multi-tenant architecture therefore allows different sets of users to share functionality without necessarily sharing any of the data 532 belonging to or otherwise associated with other tenants.

The multi-tenant database 530 is any sort of repository or other data storage system capable of storing and managing the data 532 associated with any number of tenants. The database 530 may be implemented using any type of conventional database server hardware. In some embodiments, the database 530 shares processing hardware 504 with the server 502, while in other embodiments, the database 530 is implemented using separate physical and/or virtual database server hardware that communicates with the server 502 to perform the various functions described herein.

In practice, the data 532 may be organized and formatted in any manner to support the application platform 510. In various embodiments, the data 532 is suitably organized into a relatively small number of large data tables to maintain a semi-amorphous "heap"-type format. The data 532 can then be organized as needed for a particular virtual application 528. In various embodiments, conventional data relationships are established using any number of pivot tables 534 that establish indexing, uniqueness, relationships between entities, and/or other aspects of conventional database organization as desired. Further data manipulation and report formatting is generally performed at run-time using a variety of metadata constructs. Metadata within a universal data directory (UDD) 536, for example, can be used to describe any number of forms, reports, workflows, user access privileges, business logic and other constructs that are common to multiple tenants. Tenant-specific formatting, functions and other constructs may be maintained as tenant-specific metadata 538 for each tenant, as desired. Rather than forcing the data 532 into an inflexible global structure that is common to all tenants and applications, the database 530 is organized to be relatively amorphous, with the pivot tables 534 and the metadata 538 providing additional structure on an as-needed basis. To that end, the application platform 510 suitably uses the pivot tables 534 and/or the metadata 538 to generate "virtual" components of the virtual applications 528 to logically obtain, process, and present the relatively amorphous data 532 from the database 530.

The server 502 is implemented using one or more actual and/or virtual computing systems that collectively provide the dynamic application platform 510 for generating the virtual applications 528. For example, the server 502 may be implemented using a cluster of actual and/or virtual servers operating in conjunction with each other, typically in association with conventional network communications, cluster management, load balancing and other features as appropriate. The server 502 operates with any sort of conventional processing hardware 504, such as a processor 505, memory 506, input/output features 507 and the like. The input/output features 507 generally represent the interface(s) to networks (e.g., to the network 545, or any other local area, wide area or other network), mass storage, display devices, data entry devices and/or the like. The processor 505 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 506 represents any non-transitory short or long term storage or other computer-readable media capable of storing programming instructions for execution on the processor 505, including any sort of random access memory (RAM), read only memory (ROM), flash memory, magnetic or optical mass storage, and/or the like. The computer-executable programming instructions, when read and executed by the server 502 and/or processor 505, cause the server 502 and/or processor 505 to establish, generate, or otherwise facilitate the application platform 510 and/or virtual applications 528 and perform additional tasks, operations, functions, and processes herein. It should be noted that the memory 506 represents one suitable implementation of such computer-readable media, and alternatively or additionally, the server 502 could receive and cooperate with computer-readable media (not separately shown) that is realized as a portable or mobile component or platform, e.g., a portable hard drive, a USB flash drive, an optical disc, or the like.

The application platform 510 is any sort of software application or other data processing engine that generates the virtual applications 528 that provide data and/or services to the client devices 540. In a typical embodiment, the application platform 510 gains access to processing resources, communications interfaces and other features of the processing hardware 504 using any sort of conventional or proprietary operating system 508. The virtual applications 528 are typically generated at run-time in response to input received from the client devices 540. For the illustrated embodiment, the application platform 510 includes a bulk data processing engine 512, a query generator 514, a search engine 516 that provides text indexing and other search functionality, and a runtime application generator 520. Each of these features may be implemented as a separate process or other module, and many equivalent embodiments could include different and/or additional features, components or other modules as desired.

The runtime application generator 520 dynamically builds and executes the virtual applications 528 in response to specific requests received from the client devices 540. The virtual applications 528 are typically constructed in accordance with the tenant-specific metadata 538, which describes the particular tables, reports, interfaces and/or other features of the particular application 528. In various embodiments, each virtual application 528 generates dynamic web content that can be served to a browser or other client program 542 associated with its client device 540, as appropriate.

The runtime application generator 520 suitably interacts with the query generator 514 to efficiently obtain multi-tenant data 532 from the database 530 as needed in response to input queries initiated or otherwise provided by users of the client devices 540. In a typical embodiment, the query generator 514 considers the identity of the user requesting a particular function (along with the user's associated tenant), and then builds and executes queries to the database 530 using system-wide metadata 536, tenant specific metadata 538, pivot tables 534, and/or any other available resources. The query generator 514 in this example therefore maintains security of the common database 530 by ensuring that queries are consistent with access privileges granted to the user that initiated the request.

Figure 5:
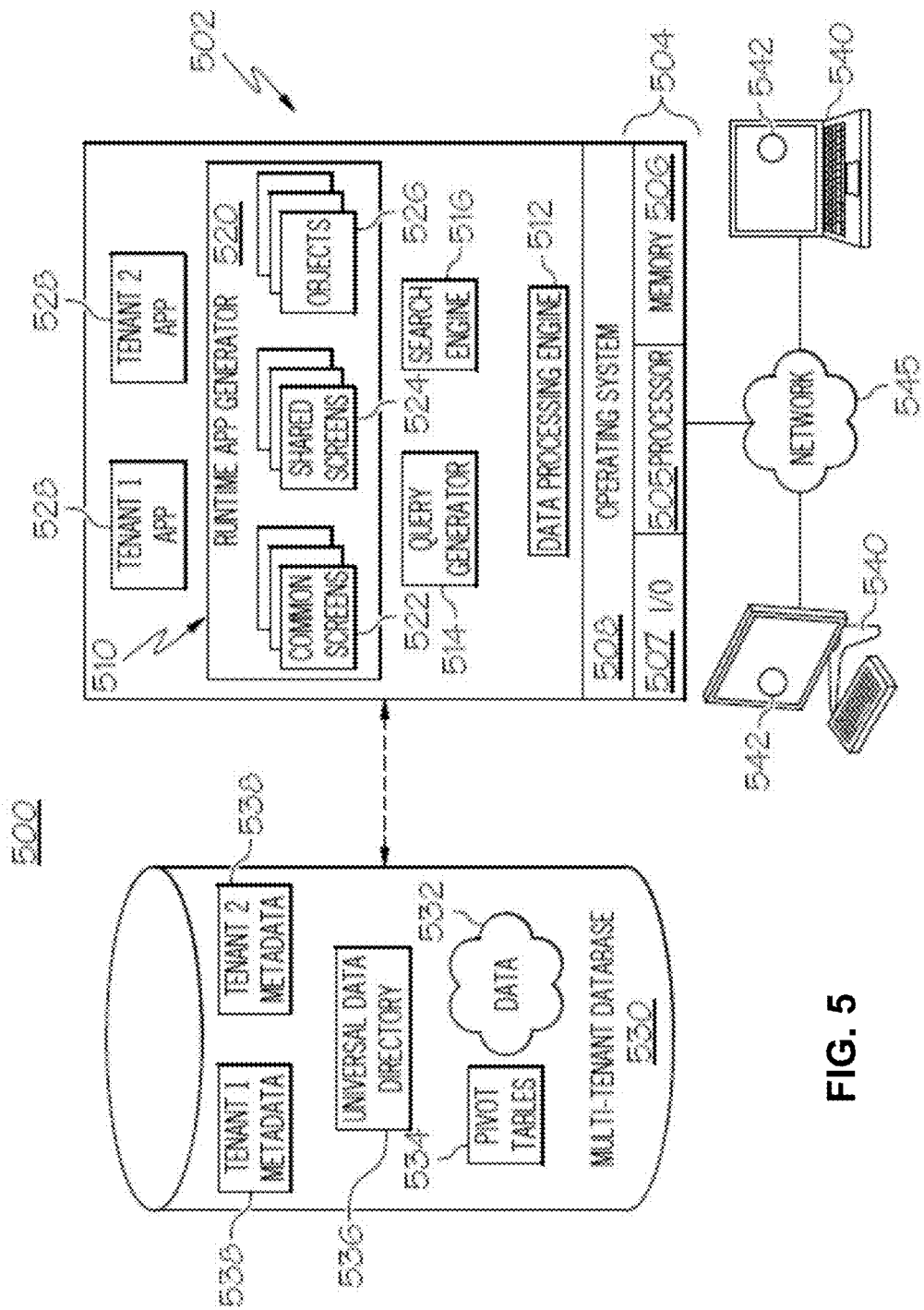
FIG. 5 depicts an exemplary multi-tenant database system.

Still referring to FIG. 5, the data processing engine 512 performs bulk processing operations on the data 532 such as uploads or downloads, updates, online transaction processing, and/or the like. In many embodiments, less urgent bulk processing of the data 532 can be scheduled to occur as processing resources become available, thereby giving priority to more urgent data processing by the query generator 514, the search engine 516, the virtual applications 528, etc.

In operation, developers use the application platform 510 to create data-driven virtual applications 528 for the tenants that they support. Such virtual applications 528 may make use of interface features such as tenant-specific screens 524, universal screens 522 or the like. Any number of tenant-specific and/or universal objects 526 may also be available for integration into tenant-developed virtual applications 528. The data 532 associated with each virtual application 528 is provided to the database 530, as appropriate, and stored until it is requested or is otherwise needed, along with the metadata 538 that describes the particular features (e.g., reports, tables, functions, etc.) of that particular tenant-specific virtual application 528. For example, a virtual application 528 may include a number of objects 526 accessible to a tenant, wherein for each object 526 accessible to the tenant, information pertaining to its object type along with values for various fields associated with that respective object type are maintained as metadata 538 in the database 530. In this regard, the object type defines the structure (e.g., the formatting, functions and other constructs) of each respective object 526 and the various fields associated therewith.

Still referring to FIG. 5, the data and services provided by the server 502 can be retrieved using any sort of personal computer, mobile telephone, tablet or other network-enabled client device 540 on the network 545. In an exemplary embodiment, the client device 540 includes a display device, such as a monitor, screen, or another conventional electronic display capable of graphically presenting data and/or information retrieved from the multi-tenant database 530, as described in greater detail below. Typically, the user operates a conventional browser or other client program 542 executed by the client device 540 to contact the server 502 via the network 545 using a networking protocol, such as the hypertext transport protocol (HTTP) or the like. The user typically authenticates his or her identity to the server 502 to obtain a session identifier ("SessionID") that identifies the user in subsequent communications with the server 502. When the identified user requests access to a virtual application 528, the runtime application generator 520 suitably creates the application at run time based upon the metadata 538, as appropriate. As noted above, the virtual application 528 may contain Java, ActiveX, or other content that can be presented using conventional client software running on the client device 540; other embodiments may simply provide dynamic web or other content that can be presented and viewed by the user, as desired. As described in greater detail below, the query generator 514 suitably obtains the requested subsets of data 532 from the database 530 as needed to populate the tables, reports or other features of the particular virtual application 528.

For the sake of brevity, conventional techniques related to computer programming, computer networking, data processing, cryptography, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components and modules (e.g., modules 330 and 332) shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method for bug-fix notification, comprising:
   receiving, at a development environment comprising one or more computer systems, a customer support request from a customer, wherein the customer support request identifies an application and a software bug associated with the application;
   modifying the application, at the development environment, to produce an updated software release that addresses the software bug;
   deploying the updated software release to a production environment comprising at least a mobile device, wherein the application comprises a mobile software application, and wherein the production environment comprises a common application platform for executing the updated software release;
   updating a case status report associated with the application to reflect the deployed, updated software release;
   automatically determining that the updated software release addresses the software bug, by querying the development environment for additional information regarding the software bug, wherein the additional information comprises a bug number, a release number, and a release date for the updated software release; and
   directly and automatically notifying the customer that the updated software release addresses the software bug, wherein the step of directly notifying comprises automatically generating and sending a notification email directly to the customer when the case status report is updated, and wherein the customer is directly notified in response to the received customer support request sent by the customer.

2. The computer-implemented method of claim 1, wherein the production environment includes a multi-tenant database.

3. The computer-implemented method of claim 1, wherein the step of automatically determining includes receiving a notification event from a development environment indicating that the updated software release addresses the software bug.

4. An internal bug tracking system comprising:
   a production environment communicatively coupled to a customer over a network, wherein the production environment comprises at least a mobile computing device;
   a development environment communicatively coupled to the production environment, the development environment including a case status server communicatively coupled to the development environment and the production environment, the case status server configured to:
   receive, from the customer, a customer support request identifying an application within the production environment and a software bug associated with the application, wherein the application comprises a mobile software application;
   determine that an updated software release deployed to the production environment addresses the software bug by:
      automatically detecting an event notification relating to the status of the application; and
      querying the development environment for additional information regarding the software bug, wherein the additional information comprises a bug number, a release number, and a release date for the updated software release;
   update a case status report associated with the application to reflect the deployed, updated software release; and
   directly and automatically notify the customer that the updated software release addresses the software bug, wherein the step of directly notifying comprises automatically generating and sending a notification email directly to the customer when the case status report is updated, and wherein the customer is directly notified in response to the received customer support request sent by the customer.

5. The bug-fix notification system of claim 4, wherein the production environment is associated with a multi-tenant database.

6. The bug-fix notification system of claim 4, wherein the case status server receives a notification event from the development environment indicating that the updated software release addresses the software bug.

7. The bug-fix notification system of claim 6, wherein the case-status server is configured to automatically determine that a status of the updated software release has been changed to "deployed."

8. The bug-fix notification system of claim 4, further including a bug communication server communicatively coupled to the production environment and the development environment, the bug communication server configured to transfer information regarding the customer support request from the production environment to the development environment.

9. A computing device comprising a processing system and a memory, wherein the memory comprises computer-executable instructions that, when executed by the processing system, cause the computing device to:

detect, at a development environment comprising one or more computer systems, that an updated software release has been deployed to a production environment communicatively coupled over a network to a customer, wherein the production environment comprises a mobile computing device, and wherein the updated software release is associated with a mobile software application;

automatically determine that the updated software release addresses a software bug associated with a customer support request associated with the customer by querying the development environment for additional information regarding the software bug, wherein the additional information comprises a bug number, a release number, and a release date for the updated software release, wherein the customer support request identifying identifies an application and a software bug associated with the application;

updating a case status report associated with the application to reflect the deployed, updated software release; and directly and automatically notifying the customer, in response to a customer support request received from the customer, that the updated software release addresses the software bug, wherein the step of directly notifying comprises automatically generating and sending a notification email directly to the customer when the case status report is updated.

10. The computing device of claim 9, wherein the application is used in connection with a multi-tenant database application.

11. The computing device of claim 9, wherein the computing device is configured to automatically determine that a status of the updated software release has been changed to "deployed."

* * * * *